US012651765B2

(12) United States Patent　　　　　(10) Patent No.:　US 12,651,765 B2
Kim et al.　　　　　　　　　　　　　　(45) Date of Patent:　　Jun. 9, 2026

(54) BATTERY MODULE, MANUFACTURING METHOD FOR BATTERY MODULE, AND VEHICLE AND BATTERY PACK COMPRISING BATTERY MODULE

(71) Applicant: LG Energy Solution, Ltd., Seoul (KR)

(72) Inventors: Seung-Joon Kim, Daejeon (KR); Min-Ho Kwon, Daejeon (KR); Jae-Uk Ryu, Daejeon (KR); Jeong Bin Yu, Daejeon (KR); Young-Bum Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 657 days.

(21) Appl. No.: 17/770,160

(22) PCT Filed: Nov. 12, 2020

(86) PCT No.: PCT/KR2020/015890
§ 371 (c)(1),
(2) Date: Apr. 19, 2022

(87) PCT Pub. No.: WO2021/096248
PCT Pub. Date: May 20, 2021

(65) Prior Publication Data
US 2022/0393306 A1　　　Dec. 8, 2022

(30) Foreign Application Priority Data
Nov. 13, 2019　　(KR) ........................ 10-2019-0145241

(51) Int. Cl.
*H01M 10/04*　　　　(2006.01)
*H01M 50/211*　　　(2021.01)
(Continued)

(52) U.S. Cl.
CPC ... *H01M 10/0481* (2013.01); *H01M 10/0404* (2013.01); *H01M 50/211* (2021.01);
(Continued)

(58) Field of Classification Search
None
See application file for complete search history.

(56) References Cited

U.S. PATENT DOCUMENTS 2,487,985 A * 11/1949 Ruben ..................... H01M 6/44
429/157
6,797,429 B1　9/2004 Komatsu
(Continued)

FOREIGN PATENT DOCUMENTS

CN　　001967902 A　　5/2007
CN　　103026533 A　　4/2013
(Continued)

OTHER PUBLICATIONS

Machine Translation of WO 2018163708A1 (Year: 2018).*
(Continued)

*Primary Examiner* — Gregg Cantelmo
(74) *Attorney, Agent, or Firm* — Lerner David LLP

(57) ABSTRACT

Disclosed is a battery module, which includes a plurality of battery cells stacked on each other, and a plurality of adhesive sheets respectively provided between the plurality of battery cells and configured to generate an adhesion force after the plurality of battery cells are aligned.

3 Claims, 10 Drawing Sheets

(51) Int. Cl.
H01M 50/244 (2021.01)
H01M 50/291 (2021.01)
H01M 50/293 (2021.01)
H01M 50/46 (2021.01)

(52) U.S. Cl.
CPC ....... H01M 50/244 (2021.01); H01M 50/291 (2021.01); H01M 50/293 (2021.01); H01M 50/461 (2021.01)

(56) References Cited

U.S. PATENT DOCUMENTS

| | | | |
|---|---|---|---|
| 2005/0136324 A1 | 6/2005 | Yamada et al. | |
| 2010/0003594 A1 | 1/2010 | Hong et al. | |
| 2012/0156538 A1 | 6/2012 | Meintschel et al. | |
| 2013/0130099 A1 | 5/2013 | Lee et al. | |
| 2013/0280585 A1 | 10/2013 | Morisaki et al. | |
| 2015/0072185 A1 | 3/2015 | Cho et al. | |
| 2015/0228945 A1 | 8/2015 | Maruoka | |
| 2015/0303425 A1 | 10/2015 | Kong | |
| 2016/0149254 A1 | 5/2016 | Ban et al. | |
| 2016/0221306 A1 | 8/2016 | Uriu et al. | |
| 2016/0233465 A1 | 8/2016 | Lee et al. | |
| 2016/0301045 A1 | 10/2016 | Tyler et al. | |
| 2018/0145294 A1 | 5/2018 | Choi et al. | |
| 2019/0372079 A1 | 12/2019 | Nakamoto et al. | |
| 2020/0006726 A1* | 1/2020 | Shin | H01M 10/625 |
| 2023/0006288 A1 | 1/2023 | Kim et al. | |

FOREIGN PATENT DOCUMENTS

| | | | |
|---|---|---|---|
| CN | 104584264 A | 4/2015 | |
| CN | 104603985 A | 5/2015 | |
| CN | 204905313 U | 12/2015 | |
| CN | 107615516 A | 1/2018 | |
| CN | 109852275 A | 6/2019 | |
| CN | 109997242 A | 7/2019 | |
| CN | 110226245 A | 9/2019 | |
| JP | 2008091206 A | 4/2008 | |
| JP | 2008-248151 A | 10/2008 | |
| JP | 2009252501 A | 10/2009 | |
| JP | 2011-074230 A | 4/2011 | |
| JP | 2015002264 A | 1/2015 | |
| JP | 5988668 B2 | 9/2016 | |
| JP | 2017004655 A | 1/2017 | |
| JP | 2018-037358 A | 3/2018 | |
| JP | 2018041585 A * | 3/2018 | |
| JP | 2018-081885 A | 5/2018 | |
| JP | 2019016493 A | 1/2019 | |
| JP | 2019071178 A | 5/2019 | |
| JP | 2019186034 A | 10/2019 | |
| JP | 2019186037 A | 10/2019 | |
| JP | 2019186043 A | 10/2019 | |
| KR | 20120093757 A | 8/2012 | |
| KR | 20130025246 A | 3/2013 | |
| KR | 20140064418 A | 5/2014 | |
| KR | 20150034329 A | 4/2015 | |
| KR | 20160016500 A | 2/2016 | |
| KR | 20160050692 A | 5/2016 | |
| KR | 101935054 B1 | 1/2019 | |
| KR | 20190103433 A | 9/2019 | |
| WO | 2015-029349 A1 | 3/2015 | |
| WO | WO-2018163708 A1 * | 9/2018 | ........ H01M 10/0404 |
| WO | WO-2019198518 A1 * | 10/2019 | .......... H01M 10/613 |

OTHER PUBLICATIONS

Machine Translation of WO 2019198518A1 (Year: 2019).*
Machine Translation of JP-2018041585-A (Year: 2018).*
Search Report dated Apr. 10, 2024 from the Office Action for Chinese Application No. 202080063410.4 issued Apr. 18, 2024, 4 pages.
International Search Report for Application No. PCT/KR2020/015890 mailed Feb. 23, 2021, 1-3 pages.
Extended European Search Report including Written Opinion for Application No. 20887075.8 dated Jun. 9, 2023, pp. 1-6.

\* cited by examiner

BATTERY MODULE, MANUFACTURING METHOD FOR BATTERY MODULE, AND VEHICLE AND BATTERY PACK COMPRISING BATTERY MODULE

CROSS-REFERENCE TO RELATED APPLICATIONS

The present application is a national phase entry under 35 U.S.C. § 371 of International Application No. PCT/KR2020/015890, filed on Nov. 12, 2020, published in Korean, which claims priority to Korean Patent Application No. 10-2019-0145241, filed on Nov. 13, 2019, the disclosures of which are hereby incorporated herein by reference.

TECHNICAL FIELD

The present disclosure relates to a battery module, a method for manufacturing the battery module, and a battery pack and a vehicle including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

In the case of a conventional battery module, when forming a stacked structure of battery cells, the battery cells are fixed using an adhesion process between the battery cells for more stable fixing of the battery cells.

However, in the case of a conventional battery module, when the battery cells are stacked using such an adhesive, the battery cells are frequently stacked and fixed inn a state where the battery cells are aligned at wrong positions, which may cause stacking failures of the battery cells.

Therefore, there is a need for providing a battery module capable of improving the adhesion and alignment process efficiency between the battery cells, a method for manufacturing the battery module, and a battery pack and a vehicle including the battery module.

DISCLOSURE

Technical Problem

Therefore, the present disclosure is directed to providing a battery module, which may improve the efficiency of the adhesion and alignment process between battery cells, a method for manufacturing the battery module, and a battery pack and a vehicle including the battery module.

Technical Solution

In one aspect of the present disclosure, there is provided a battery module, comprising: a plurality of battery cells stacked on each other; and a plurality of adhesive sheets respectively provided between the plurality of battery cells and configured to generate an adhesion force after the plurality of battery cells are aligned.

The plurality of adhesive sheets may be provided as thermal adhesive sheets that are melted by heat over a predetermined temperature to generate an adhesion force.

After the plurality of battery cells are aligned, the plurality of adhesive sheets may be temporarily fixed together with the plurality of battery cells and melted at once over the predetermined temperature to bond the plurality of battery cells.

Each of the plurality of battery cells may include an electrode assembly; a battery case having a case body configured to accommodate the electrode assembly and a case terrace configured to extend from the case body; and a pair of electrode leads configured to protrude from the case terrace of the battery case and electrically connected to the electrode assembly, and the plurality of adhesive sheets may be disposed on the case body, respectively.

Each of the plurality of adhesive sheets may have an area corresponding to an area of the case body.

The plurality of adhesive sheets may be disposed to be spaced apart from each other by a predetermined distance on each case body.

In another aspect of the present disclosure, there is also provided a method for manufacturing a battery module, comprising: stacking a plurality of battery cells and a plurality of adhesive sheets alternately so that the plurality of battery cells and the plurality of adhesive sheets are stacked in a stacking jig; aligning the plurality of battery cells and the plurality of adhesive sheets; temporarily fixing the plurality of battery cells and the plurality of adhesive sheets inside the stacking jig; heating the stacking jig over a predetermined temperature so that the plurality of adhesive sheets are melted to activate an adhesion force; and removing the stacking jig after the plurality of battery cells are bonded.

The step of aligning the plurality of battery cells and the plurality of adhesive sheets may be performed at least once.

Each of the plurality of battery cells may include an electrode assembly; a battery case having a case body configured to accommodate the electrode assembly and a case terrace configured to extend from the case body; and a pair of electrode leads configured to protrude from the case terrace of the battery case and electrically connected to the electrode assembly, and the plurality of adhesive sheets may be disposed on the case body, respectively.

Each of the plurality of adhesive sheets may have an area corresponding to an area of the case body.

Moreover, the present disclosure further provides a battery pack, comprising: at least one battery module according to the above embodiments; and a pack case configured to package the at least one battery module.

In addition, the present disclosure further provides a vehicle, comprising at least one battery pack according to the above embodiments.

Advantageous Effects

According to various embodiments as above, it is possible to provide a battery module, which may improve the efficiency of the adhesion and alignment process between battery cells, a method for manufacturing the battery module, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
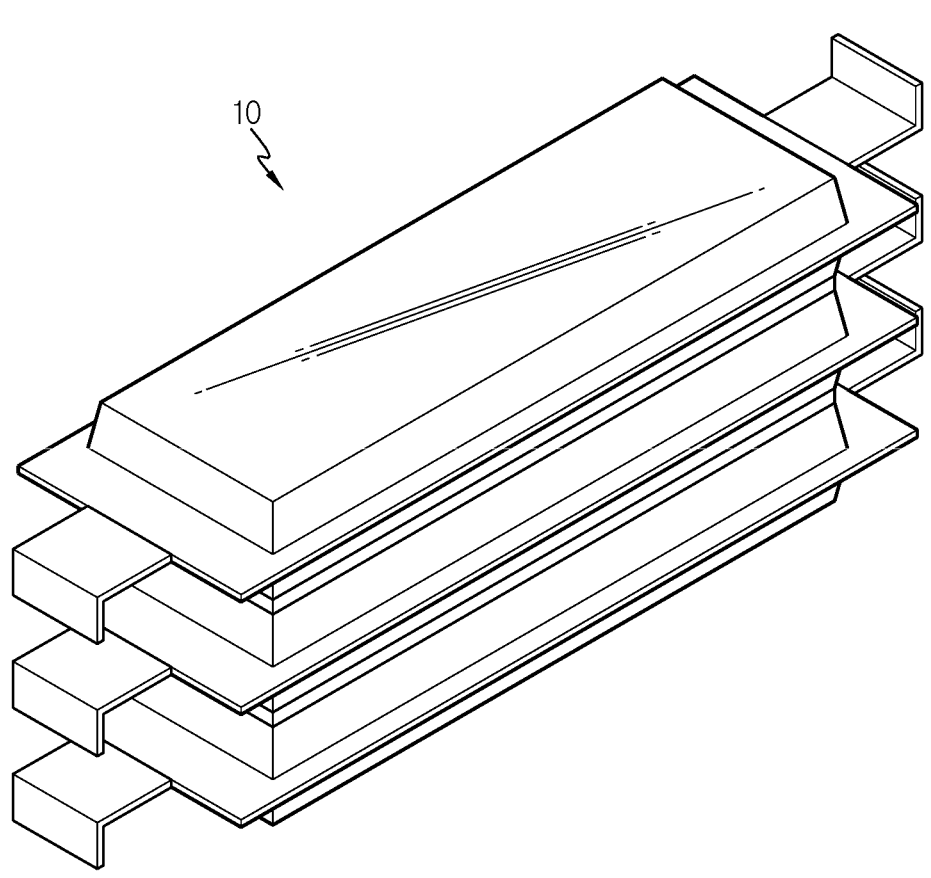
FIG. 1 is a diagram for illustrating a battery module according to an embodiment of the present disclosure.
Figure 2:
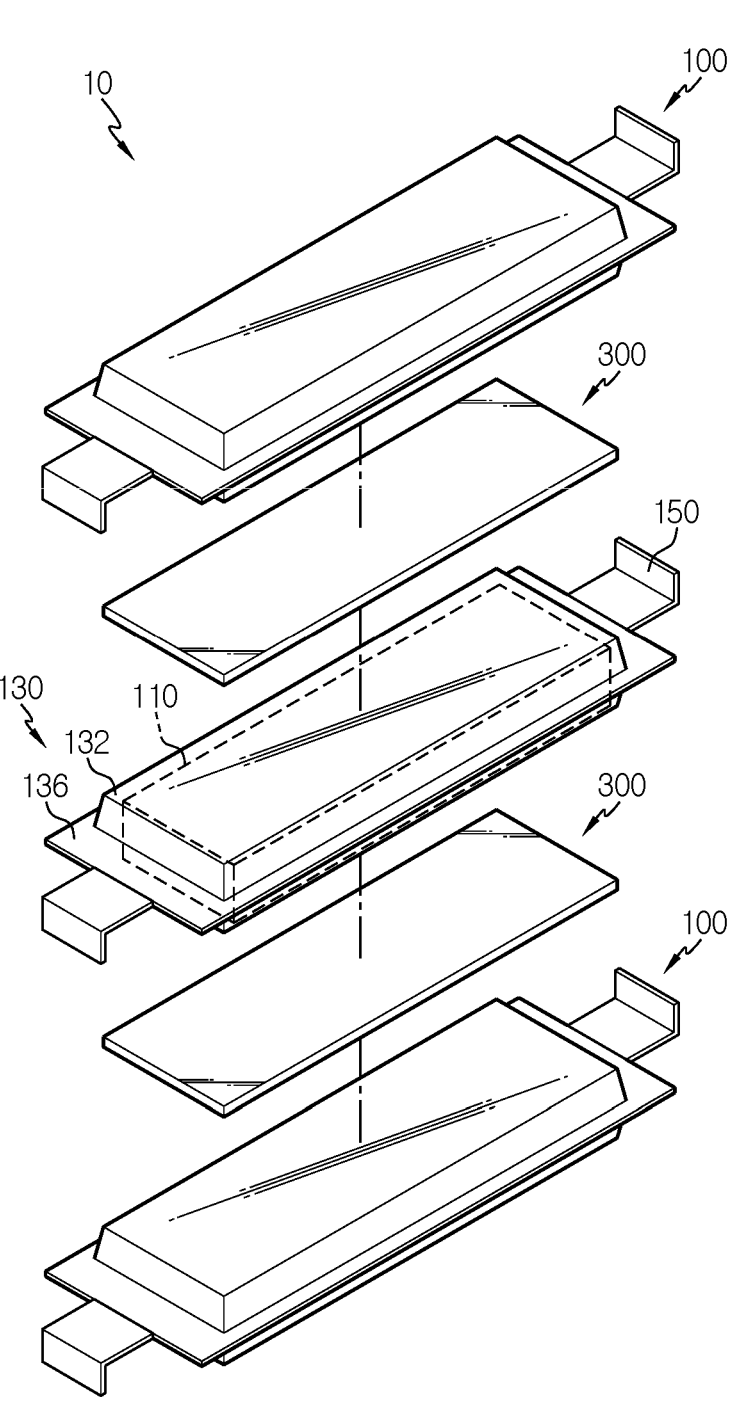
FIG. 2 is an exploded perspective view showing the battery module of FIG. 1.
Figure 3:
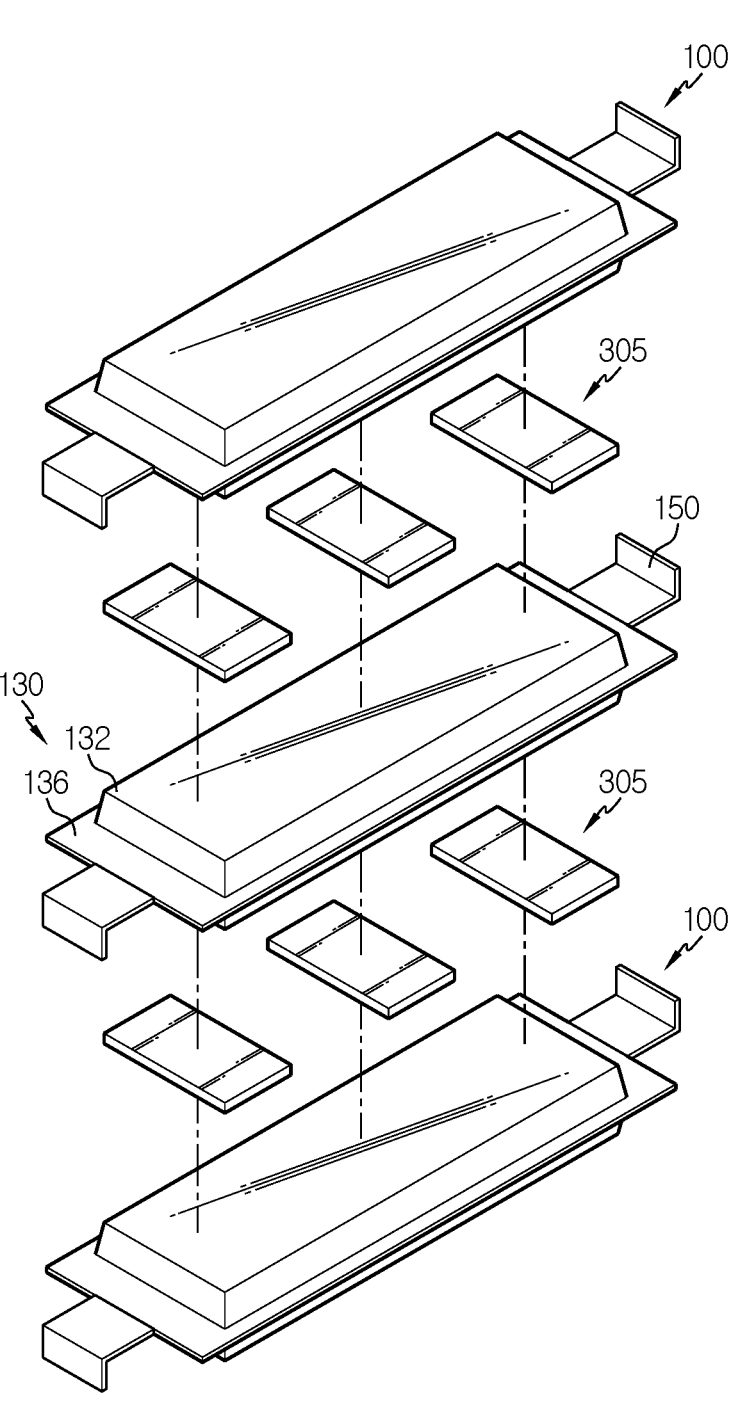
FIG. 3 is a diagram for illustrating an adhesive sheet according to another embodiment of the battery module of FIG. 1.

FIG. 1 is a diagram for illustrating a battery module according to an embodiment of the present disclosure, FIG. 2 is an exploded perspective view showing the battery module of FIG. 1, and FIG. 3 is a diagram for illustrating an adhesive sheet according to another embodiment of the battery module of FIG. 1.

Referring to FIGS. 1 to 3, a battery module 10 may include a battery cell 100 and an adhesive sheet 300.

The battery cell 100 is a secondary battery and may be provided as a pouch-type secondary battery, a rectangular secondary battery or a cylindrical secondary battery. Hereinafter, in this embodiment, it will be described that the battery cell 100 is provided as a pouch-type secondary battery.

The battery cell 100 may be provided in plural.

The plurality of battery cells 100 may be stacked on each other to be electrically connected to each other. Here, the plurality of battery cells 100 may be bonded to each other by means of an adhesive sheet 300, explained later, for more stable fixation, thereby being more stably stacked. Although not shown, the plurality of battery cells 100 may be accommodated in a structure such as a module case that is a component of the battery module 10.

Each of the plurality of battery cells 100 may include an electrode assembly 110, a battery case 130, and an electrode lead 150.

The electrode assembly 110 may include a positive electrode plate, a negative electrode plate, a separator, and the like. The electrode assembly 110 is well known in the art and thus will not be described in detail here.

The battery case 130 accommodates the electrode assembly 110, and may accommodate a pair of electrode leads 150, explained later, so that the pair of electrode leads 150 protrude out of the battery case 130 at least partially.

The battery case 130 may include a case body 132 and a case terrace 136.

The case body 132 may accommodate the electrode assembly 110. To this end, an accommodation space capable of accommodating the electrode assembly 110 may be provided in the case body 132.

The case terrace 136 extends from both ends of the case body 132 and may extend from the case body 132 along a longitudinal direction of the battery cells 100.

The electrode lead 150 may be provided in a pair.

The pair of electrode leads 150 are electrically connected to the electrode assembly 110 and may protrude from the case terrace 136 of the battery case 130.

The adhesive sheet 300 is for bonding the plurality of battery cells 100, and may be provided in plural.

The plurality of adhesive sheets 300 are respectively provided between the plurality of battery cells 100, and may generate an adhesion force after the plurality of battery cells 100 are aligned.

The plurality of adhesive sheets 300 may be provided as thermal adhesive sheets that are melted over a predetermined temperature to generate an adhesion force. The predetermined temperature may be a temperature higher than room temperature. Since the plurality of adhesive sheets 300 according to this embodiment are provided as the thermal adhesive sheets, there is no adhesion force at room temperature, and the adhesion force may be generated when the thermal adhesive sheets are melted at the predetermined temperature, namely at a temperature higher than room temperature.

Each of the plurality of adhesive sheets 300 may be disposed on the case body 132 of the battery case 130 of the plurality of battery cells 100. Here, each of the plurality of adhesive sheets 300 may have an area corresponding to the area of the case body 132 so as to secure a higher adhesion force.

The plurality of adhesive sheets 300 may be formed to have an area slightly greater than the outermost rim of the case body 132. In this case, even if a slight distortion occurs when the plurality of adhesive sheets 300 are stacked, it is possible to prevent the adhesion force from being lowered. Meanwhile, as shown in FIG. 3, the plurality of adhesive sheets 305 may be disposed to be spaced apart from each other by a predetermined distance on each case body 132.

After alignment of the plurality of battery cells 100, the plurality of adhesive sheets 300 may be temporarily fixed together with the plurality of battery cells 100 and melted at once over the predetermined temperature to bond the plurality of battery cells 100.

Hereinafter, a specific manufacturing process when stacking the battery cells 100 of the battery module 10 according to this embodiment will be described in more detail.

FIGS. 4 to 7 are diagrams for illustrating a method for manufacturing the battery module of FIG. 1.

Figure 4:
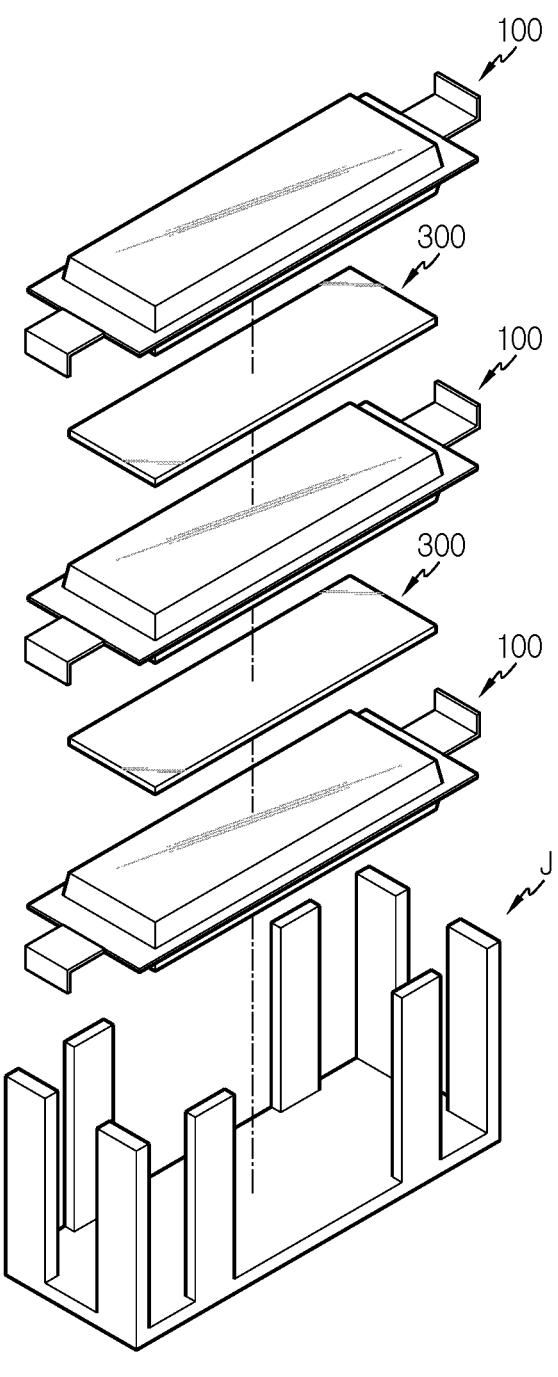
FIGS. 4 to 7 are diagrams for illustrating a method for manufacturing the battery module of FIG. 1.
Figure 5:
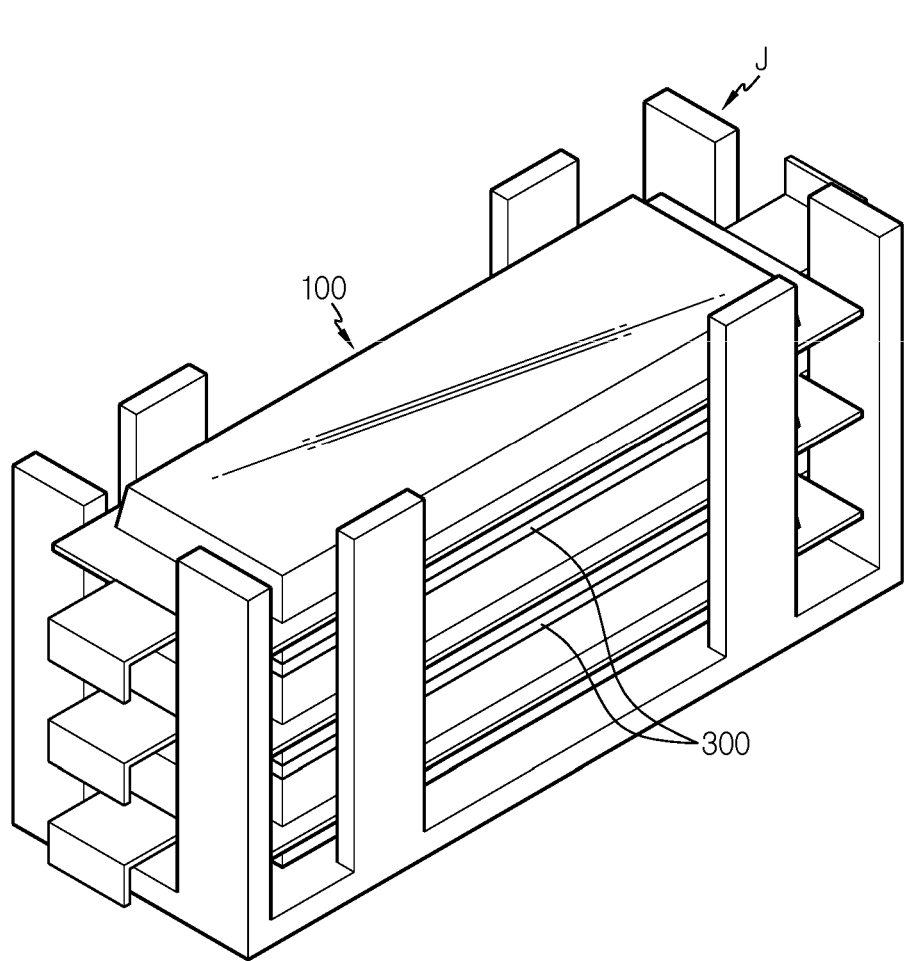

Referring to FIGS. 4 and 5, when the battery cells 100 are stacked and fixed, first, a worker or the like may stack the battery cells 100 and the adhesive sheets 300 alternately in a separate stacking jig J, at room temperature.

After that, the worker or the like may adjust the positions of the battery cells 100 and the adhesive sheets 300 to desired locations by aligning the plurality of battery cells 100 and the adhesive sheets 300 inside the stacking jig J.

At this time, since the adhesive sheets 300 do not generate an adhesion force due to the room temperature, the worker or the like may align the plurality of battery cells 100 and the adhesive sheets 300 more naturally, and may repeatedly adjust the positions of the plurality of battery cells 100 and the adhesive sheets 300 at least once or several times as necessary until the plurality of battery cells 100 and the adhesive sheets 300 are positioned at desired locations.

Figure 6:
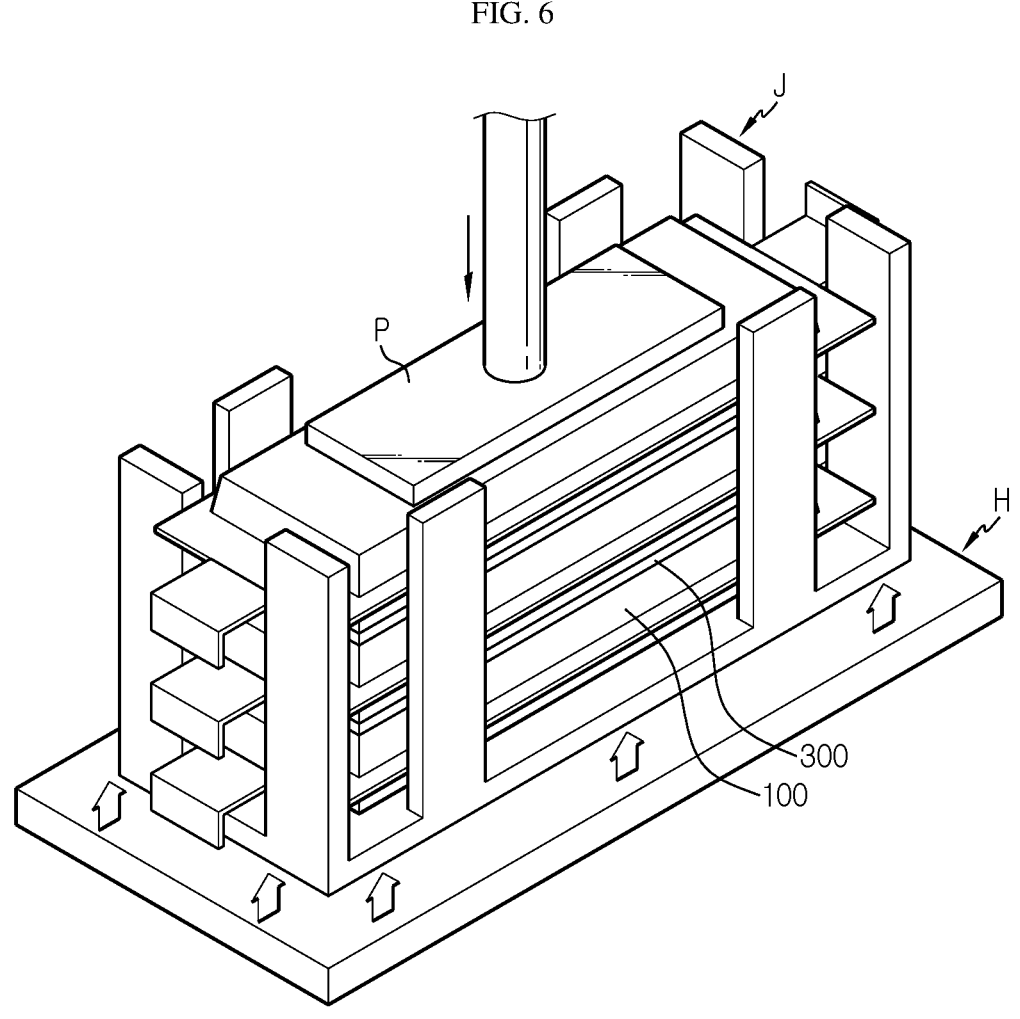
Figure 7:
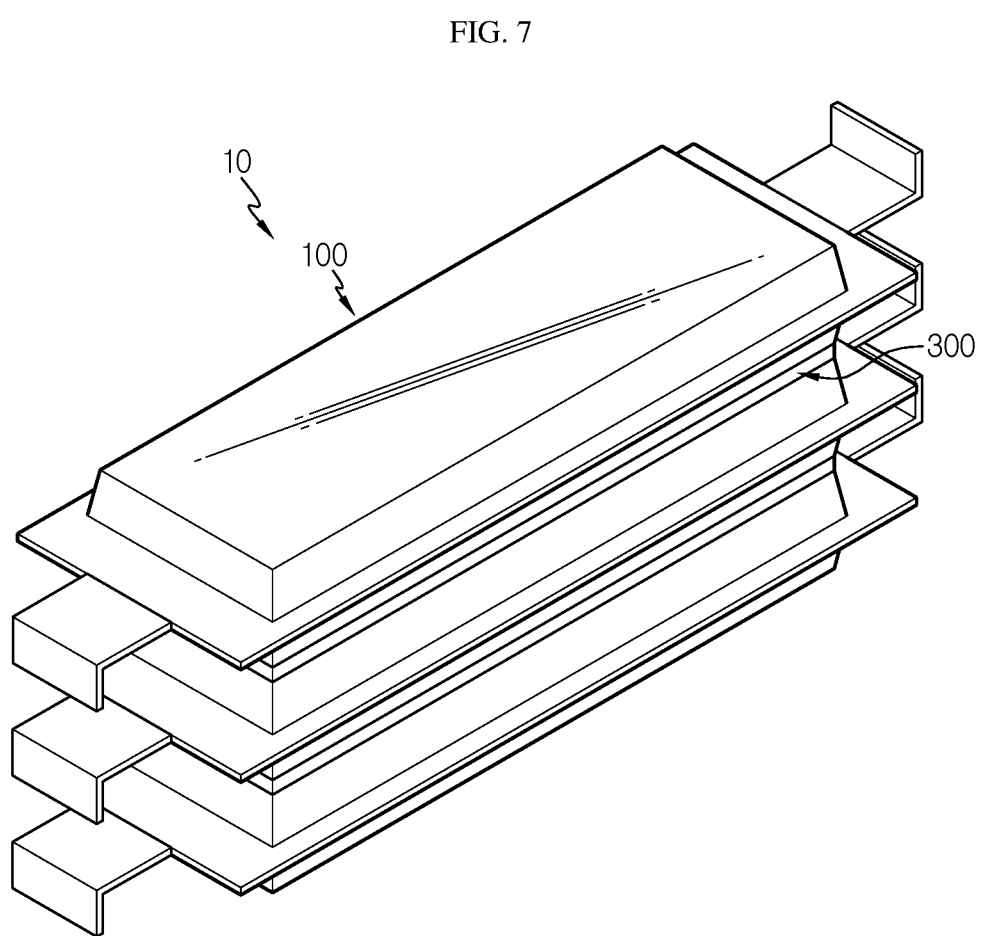

Referring to FIGS. 6 and 7, if the battery cells 100 and the adhesive sheets 300 are completely aligned to desired positions, the worker or the like may temporarily fix the plurality of battery cells 100 and the plurality of adhesive sheets 300 inside the stacking jig J. This temporary fixation may be performed by pressing using a pressing jig P. This is only an example, and it is also possible to use other devices or methods for the temporary fixation.

After that, the worker or the like may heat the stacking jig J over the predetermined temperature or higher so that the plurality of adhesive sheets 300 are melted to activate an adhesion force. To this end, the worker or the like may heat the stacking jig J using a heating device H to a temperature at which the adhesion force of the plurality of adhesive sheets 300 may be activated. This heating may be an indirect heating through the stacking jig J or a direct heating not passing through the stacking jig J, or both of them. Due to the heating, the adhesive sheets 300 may be melted over the predetermined temperature to bond the plurality of battery cells 100 to each other.

After the plurality of battery cells 100 are bonded, the worker or the like may remove the stacking jig J from the battery cells 100, and transfer or guide the stacked battery cells 100 to a later process or the like for the battery module 10. The later process may be a process for mounting other components of the battery module 10, or the like.

Figure 8:
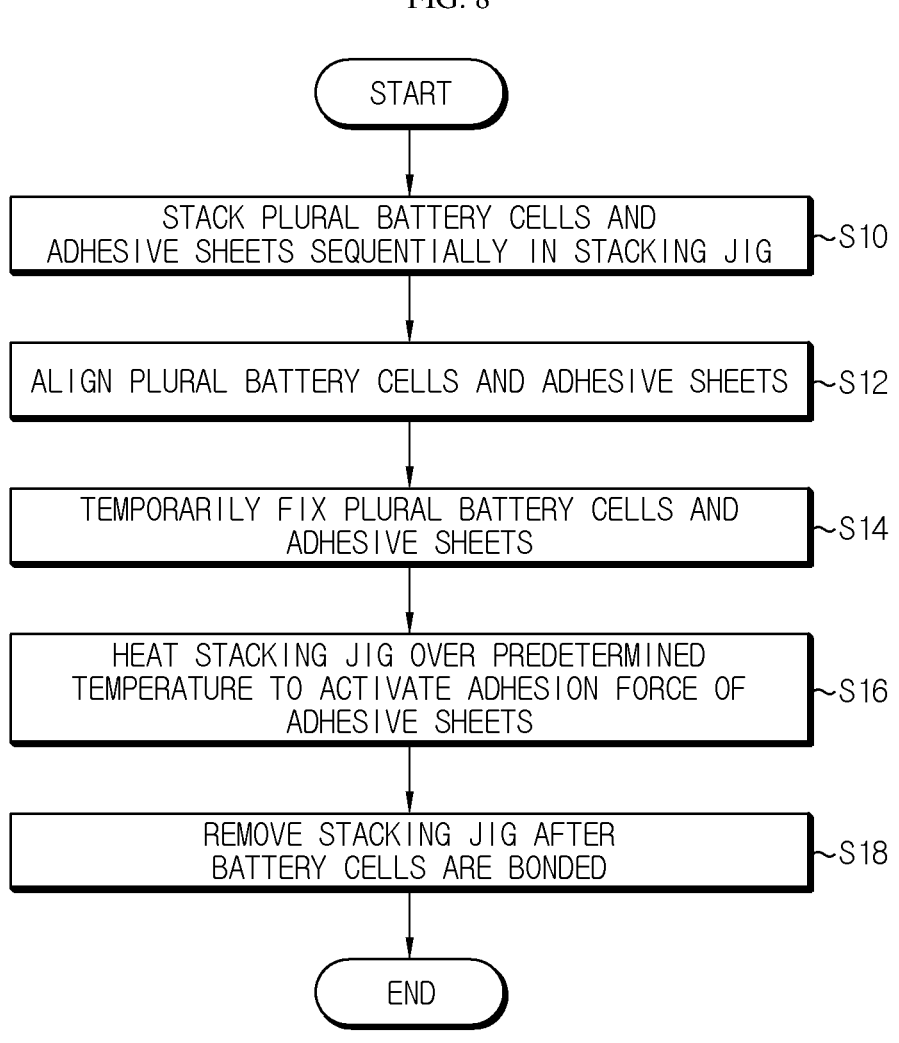
FIG. 8 is a flowchart for illustrating the method for manufacturing the battery module of FIG. 1.

FIG. 8 is a flowchart for illustrating the method for manufacturing the battery module of FIG. 1.

Referring to FIG. 8, when the battery module is bonded and aligned, a worker such as a manufacturer may sequentially stack a plurality of battery cells and a plurality of adhesive sheets in the stacking jig (S10). During such sequential lamination, the plurality of battery cells and a plurality of adhesive sheets may be alternately stacked with each other.

After that, the worker or the like may align the plurality of battery cells and the plurality of adhesive sheets to desired positions inside the stacking jig (S12). Here, since the adhesive sheets are not yet bonded to the battery cells, the worker or the like may freely adjust the positions for the alignment until the plurality of battery cells and the plurality of adhesive sheets are aligned to desired positions.

If the alignment is completed, the worker or the like may temporarily fix the plurality of battery cells and the plurality of adhesive sheets (S14). Here, the temporary fixing may be performed by pressing using a pressing jig.

After that, the worker or the like may heat the stacking jig over a predetermined temperature so that the adhesion force of the adhesive sheets is activated (S16). For heating over the predetermined temperature, a separate heating device may be used.

If the battery cells are fixed by means of the adhesive sheets, the worker or the like may remove the stacking jig after the battery cells are bonded (S18). After that, the battery cells stacked and fixed to each other may be transferred to a later process for mounting other components of the battery module, or the like.

As described above, in the battery module 10 according to this embodiment, when stacking and fixing the battery cells 100, first, the battery cells 100 and the adhesive sheets 300 may be accurately aligned to desired positions in the stacking jig J, and then, after the alignment is completed, the adhesive sheets 300 are heated to activate the adhesion force so that the battery cells 100 are bonded and fixed to each other, thereby causing substantially no stacking failure of the battery cells 100.

Accordingly, since the adhesion and alignment quality of the battery cells 100 of the battery module 10 according to this embodiment is remarkably improved, the manufacturing quality of the battery module 10 may also be remarkably improved.

Moreover, since the adhesion process and the alignment process are performed integrally in the battery module 10 according to this embodiment, the entire assembly process time may be significantly shortened.

Figure 9:
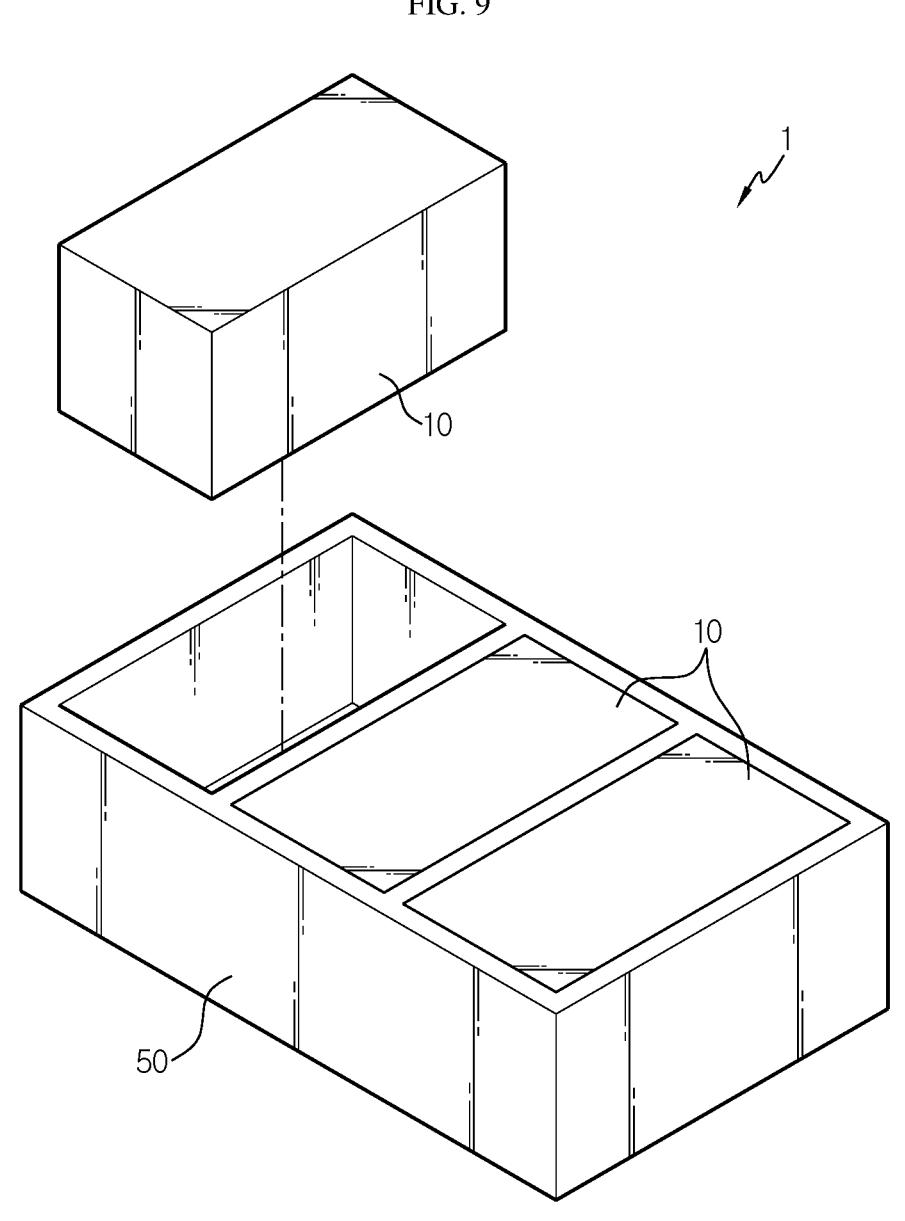
FIG. 9 is a diagram for illustrating a battery pack according to an embodiment of the present disclosure.
Figure 10:
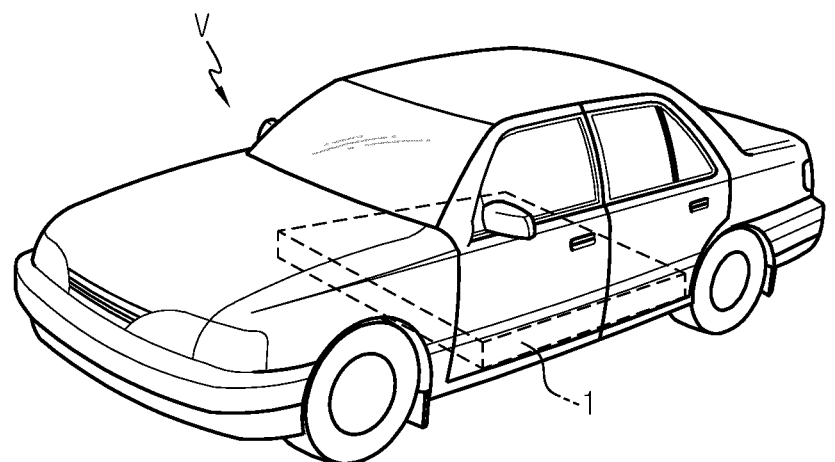
FIG. 10 is a diagram for illustrating a vehicle according to an embodiment of the present disclosure.

FIG. 9 is a diagram for illustrating a battery pack according to an embodiment of the present disclosure, and FIG. 10 is a diagram for illustrating a vehicle according to an embodiment of the present disclosure.

Referring to FIGS. 9 and 10, a battery pack 1 may include at least one battery module 10 and a pack case 50 for packaging the at least one battery module 10 according to the former embodiment.

The battery pack 1 may be provided to a vehicle V as a fuel source of the vehicle. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle V, which have the battery pack 1, include the battery module 10 as described above, and thus it is possible to implement a battery pack 1 having all the advantages of the battery module 10 described above, or devices, instruments, facilities or the like such as the vehicle V, which have the battery pack 1.

According to various embodiments as above, it is possible to provide a battery module 10, which may improve the efficiency of the adhesion and alignment process between battery cells 100, a method for manufacturing the battery module 10, and a battery pack 1 and a vehicle V including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A method for manufacturing a battery module, comprising:

stacking a plurality of battery cells and a plurality of adhesive sheets alternately in a stacking jig;

aligning the plurality of battery cells and the plurality of adhesive sheets with one another;

repeatedly adjusting positions of the plurality of battery cells and the adhesive sheets several times until the plurality of battery cells and the adhesive sheets are positioned at desired locations;

temporarily fixing the plurality of battery cells and the plurality of adhesive sheets inside the stacking jig at room temperature using a pressing jig, the adhesive sheets providing no adhesion force between the battery cells at the room temperature, a temporary fixing force on the battery cells being entirely provided by the pressing jig;

heating the stacking jig at a predetermined temperature higher than the room temperature so that the plurality of adhesive sheets are melted to activate the adhesion force between the battery cells; and removing the stacking jig and the pressing jig after the plurality of battery cells are bonded, wherein each of the plurality of battery cells includes:

an electrode assembly;

a battery case having a case body accommodating the electrode assembly therein and a case terrace extending from the case body; and a pair of electrode leads protruding from the case terrace of the battery case and electrically connected to the electrode assembly, the case terrace being thinner than the case body in a stacking direction perpendicular to a major planar surface of the case body, wherein each of the plurality of adhesive sheets is disposed on the case body portions of adjacent ones of the battery cells, respectively, and wherein, before the temporarily fixing of the battery cells and before the heating of the stacking jig, each of the plurality of adhesive sheets has a total area greater than a total area of the major planar surface of each case body.

2. A method for manufacturing a battery pack, comprising:

manufacturing at least one battery module each manufactured by the method according to claim 1; and packaging the at least one battery module in a pack case.

3. A method for manufacturing a vehicle, comprising:

manufacturing at least one battery pack each according to claim 2; and assembling the at least one battery pack in the vehicle.

* * * * *